United States Patent [19]

Müller

[11] 3,791,254

[45] Feb. 12, 1974

[54] TEACHING AID FOR DEMONSTRATING THE HARMONIC SYSTEM

[76] Inventor: Egon Müller, 7, Hauptstrabe, D-7501, Grunwettersbach, Germany

[22] Filed: Nov. 1, 1971

[21] Appl. No.: 194,176

[30] Foreign Application Priority Data

Nov. 6, 1970 Germany .......................... 2054561

[52] U.S. Cl. .................................... 84/471, 84/473

[51] Int. Cl. ........................................ G09b 15/02

[58] Field of Search .................. 84/470–474, 477 R, 84/478–482

[56] References Cited

UNITED STATES PATENTS

| | | | |
|---|---|---|---|
| 675,345 | 5/1901 | Bauer | 84/473 |
| 1,594,977 | 8/1926 | Payne | 84/473 |
| 2,542,235 | 2/1951 | Clopton | 84/474 |
| 2,832,252 | 4/1958 | Gabriel | 84/473 X |
| 3,592,099 | 7/1971 | Gibby | 84/471 |

FOREIGN PATENTS OR APPLICATIONS

| | | | |
|---|---|---|---|
| 262,888 | 10/1965 | Australia | 84/471 |
| 1,562,904 | 3/1969 | France | 84/471 |

*Primary Examiner*—Stephen J. Tomsky
*Assistant Examiner*—John F. Gonzales
*Attorney, Agent, or Firm*—Craig & Antonelli

[57] ABSTRACT

A teaching aid for demonstrating the harmonic system comprising two bar members arranged as in a slide rule, the lower member carrying the symbols and the upper member, which masks the lower member, a column of windows through which symbols from the lower bar member appear. By setting one window on a basic key note various harmonics may be read from the other windows.

8 Claims, 4 Drawing Figures

TEACHING AID FOR DEMONSTRATING THE HARMONIC SYSTEM

The invention relates to a teaching aid for the representation of the harmony system of tonal music and for the diagrammatic demonstration of the harmony sequences and keys which are in relation to one another under the laws of harmony, more particularly for automatically ascertaining the enharmonic changes, cadences and chords associated with a specific fundamental note or keynote, for facilitating the learning of the theory of harmony, and as a composition aid, the said aid consisting of two bar-shaped parts which are adapted to be displaced in sliding manner relatively to one another in the manner of a slide rule.

Knowledge of the harmony system of tonal music is incomprehensible to the average layman owing to its extensive scope which is difficult to comprehend as a whole; even lovers of music who do a good deal of amateur work generally know only the basic details of harmony theory which are absolutely necessary. Up to the present time, the knowledge of harmony theory is generally taught only by extensive instructional literature which requires years of intensive study, and an overall grasp of the subject can usually be obtained only by appropriate practical music work. The importance of the theory of harmony for the work of a practical musician as regards the reproduction and arrangement of finished musical products is generally underestimated by the average musical amateur or layman. Usually the desirable aim of musical instruction is regarded as simply the mastering of pure instrumental technique including the technique of reading notes. However, the average person interested in music is aware that further knowledge and ability have to be or at least should be obtained in addition, for musical practice, which can only be derived from the knowledge of the harmony system. To illustrate these interrelationships, one of the most frequently occurring cases may serve as an example, namely where it is necessary to provide instrumental accompaniment for singers, whether these are soloists or choirs. The person playing the accompanying instrument is often obliged to transpose the existing notes into another key in order to adapt to the key of the voice. Also included are modulation, variation and harmonic improvisation of musical themes which is already leading into free composition, and which cannot be mastered without fundamental knowledge of harmony, whether this is obtained methodically and deliberately or instinctively and unconsciously.

In the past there has been no lack of attempts to provide teaching aids for facilitating the obtaining of the necessary knowledge of musical theory, more particularly the harmony system. For this purpose various teaching aids have also been proposed already which are operated in the manner of a slide rule and consist, like a slide rule, of at least two bar-shaped parts which are displaceable relatively to one another in the longitudinal direction and are guided with guide means on one another, each of the said parts carrying musical tone designations in a specific arrangement. In known aids constructed in the manner of a slide rule, the tone designations are variously chosen in dependence on the special teaching or instructional purpose and more particularly are also arranged differently on the parts of the device. In principle, each teaching aid or device of this kind is intended to make it possible, by setting to a specific starting point, to determine all the constituents which are associated therewith by the laws of music theory, and to enable these to be read off. But since each starting point in the harmony system is connected directly or indirectly by certain laws to all the other points of the entire system, it is of course necessary to make a strict choice from the points in the harmony system which are to read off directly when starting from a specific starting point, since without such a limitation the bewildering abundance of interrelationships which could be shown between the individual points of the harmony system would not give the person being instructed an answer of the necessary clarity. Selecting the musical relationships and points of the harmony system to be shown when starting from a specific starting point can be effected substantially in dependence on the individual object of the teaching or instruction in view. For example, in the case of elementary instruction an aid, on being set to a specific fundamental or keynote, should give all the tones of the associated scale (major and/or minor) and also the number and arrangement of the associated key signatures. An aid of this kind which, however, also gives more extensive knowledge for advanced students, is described for example in German Pat. No. 868,248. Other known aids or devices proceed from other preconceptions regarding the knowledge to be imparted, as regards their arrangement and construction.

The invention has as its object to provide a teaching aid for the representation of the harmony system of the category mentioned initially which is intended, in addition to giving general knowledge of the established relationships within the harmony system by a special kind of diagrammatic representation, to give the user something with which he can obtain automatically and mechanically information such as, for example, the chords, cadences and enharmonic changes associated with a specific keynote, with a view of a freer musical development. The invention achieves this object, in a teaching aid of the type mentioned initially, by constructing one of the two parts as a symbol carrier which at its upper side comprises in equally spaced rows side by side and in columns generally transverse said rows, arranged with equal spacing, one below the other, the symbols of the keynotes and chord tones of all the keys of the major and minor series in a specific arrangement made on the basis of the circle of fifths or circle of fourths, and within each row and each column the neighbouring tone symbols are at the tone interval of a fourth in one direction and a fifth in the opposite direction, and that the other part, constructed as a window carrier and masking the symbol carrier from above over its entire surface, comprises at least one series of window apertures arranged one below the other in a column parallel to a column on the symbol carrier, the number and arrangement of these window apertures coinciding with that of the symbols within a column, so that after the suitable setting of the two parts only the symbols of a specific column are visible in the windows as the main functions of a set tonic. The advantages of the aid provided by the invention will be apparent. Arranging the entire harmony system of tones in the table on the symbol carrier consisting of rows and columsn and based on the circle of fifths, by itself gives the student who has already made considerable progress a deeper insight into the difficult field of harmony theory than would be possible without this kind of tabular arrangement; whereas the use of the window carrier gives both the beginner and also the advanced student an immediate guide regarding the main functions necessary, starting from a specific keynote.

In a preferred form of embodiment of the teaching aid according to the invention it is proposed that the symbol carrier comprises at both sides of a central column which carries the symbols of the non-sharpened tones of the C major scale, in each case 12 columns — in accordance with the chromatic scale — with the sharp keys formed by raising and the flat keys formed by lowering, so that, whilst maintaining the tone intervals of a fourth or a fifth in neighbouring columns the double-raised or double-lowered enharmonic change forms the particular end column in each case, and that the window carrier comprises at the interval corresponding to the two end columns, both sides of the first central window column, arranged in accordance with the symbol row of the C major scale on the symbol carrier, in each case one further column of windows in one or both of which the symbols of the enharmonic changes of the keys set are visible.

In this constructional form it is also advantageously proposed that the tone symbols recorded within a column of the symbol carrier are so arranged that the tonic given in the central row in each case is followed above by the dominant and then the double-dominant, and below by the sub-dominant and then the double-sub-dominant which are visible in one window column of the window carrier when the two parts are suitably set with respect to one another. By this arrangement, the special meaning of the tonic within an associated harmony system is underlined; in conjunction therewith, the arrangement described hereinbefore also shows clearly the central meaning of the C-major key, and, within this, the central significance of the C as the basic point of the entire harmony system. The window carrier guarantees the reliable finding of the main components of a desired system and the associated enharmonic changes.

A further, more complete constructional form has an additional intermediate row of symbols arranged in such a manner on the symbol carrier between the rows that within a column the major augmented third is always indicated between tonic and dominant and between dominant and double-dominant, and the minor dimished third between tonic and sub-dominant and between sub-dominant and double-sub-dominant, whereas at the window carrier additional windows are so arranged between the windows of the aforesaid window columns that they unmask the symbols of the intermediate row which are situated in the set column and correspond to the key notes of the relative minors associated with a specific set tonic, its dominant, double-dominant, sub-dominant and double-sub-dominant. Thus in this constructional form a single adjustment to a specific keynote has the result that additionally to the main functions discussed hitherto the respective relative minors are also indicated, the user of the teaching aid being thus given further information regarding the construction of the harmony system.

In further development of this improved constructional form, there are provided on the symbol carrier between the rows of main functions situated with adequate spacing from one another, in each case three intermediate rows with the same symbols which are arranged with equal spacings from one another and from the neighbouring main function rows, the window carrier comprising at both sides of the window column or columns at the spacing of the columns of the symbol carrier, respective supplementary window columns whose windows, arranged at a relatively large spacing, unmask individual symbols given at the point of intersection of the intermediate rows with the neighbouring columns, the arrangement of the windows in the supplementary window columns on the window carrier being made such in dependence on the arrangement of the symbols of the intermediate rows on the symbol carrier that in the windows of the supplementary window columns there appear the symbols of the cadences associated with the relative minors i.e. the associated dominant and sub-dominant. Thus in the case of this fuller constructional form, the user by setting the window carrier to a specific key obtains information regarding the dominant, sub-dominant, double-dominant and double-sub-dominant associated with the tonic of the relevant key, and also the respective appropriate relative minors and the dominants and sub-dominants thereof. The user is also given a comprehensive harmony group which comprises almost all possible modifications of a given musical theme likely to occur in practice.

In all the constructional forms possible within the framework of the invention it seems appropriate to provide on the tone carrier and the window carrier features which give the user at least the most necessary information regarding the musical key signatures of the key which has been set. For this purpose in one expedient constructional form there is arranged on the tone carrier above and below the rows of tone symbols in each case a number row with the numbers 0 – 12, indicating the number of sharp symbols and the number of flat symbols of the tonic which is set in each case; associated with these, on the window carrier, in each window column are respective window apertures for the number rows. When the aid is set to a specific key, the number of sharps or flats of the relevant key appears in one of the two additional windows.

The mechanical arrangement of the teaching aid according to the invention for the guiding of the two parts in sliding fashion and also the choice of material can substantially follow the lines adopted in similar devices, for example slide rules and although the two parts may be circular and rotate about a common axis, they are preferably provided in the form of longitudinal bars. The two parts may be made of cardboard, wood, plastics material or metal; they may be provided at their longitudinal sides with guide profiles for guiding one another and may be equipped with arresting means for the securing of the two parts at a selected setting.

Further details, features and advantages of the invention will become apparent from the following description of the accompanying drawings, which show in plan view in each case two constructional forms of the teaching aid according to the invention, dismantled into its component parts.

Figure 1A:
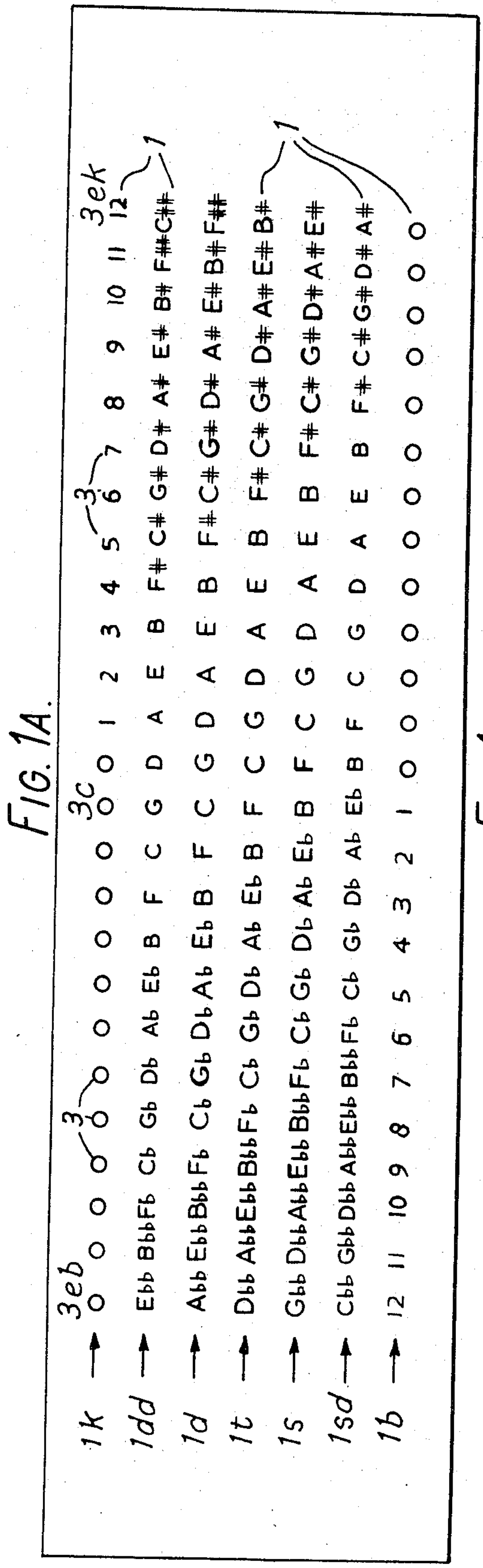
FIG. 1A shows the symbol carrier of a relatively simple constructional form which meets lesser requirements for detail.

The symbol carrier 1A, 2A and the window carrier 1B, 2B respectively of each of the two constructional forms consist of a rectangular elongated bar of any desired material such as wood, plastics material, metal, cardboard and the like, of a length and width appropriate to one another, arranged one above the other with the symbol carrier below and the window carrier above, so as to be non-displaceable in the transverse direction but displaceable relatively to one another in the longitudinal direction in the manner of slide rule parts. For this purpose they can be provided with means for guiding one another, for example longitudinal tongues and grooves, which are arranged preferably along the two longitudinal edges.

Both constructional forms embody the general principle of the invention, according to which the symbol carrier carries symbols of the harmony system in a specific arrangement and the window carrier, which is adapted to slide over it, is provided likewise in a specific arrangement with window apertures, which, when a specific window is set to a specific tone symbol on the symbol carrier as the keynote or tonic, the other windows show chord tones, cadences etc. associated therewith, and thus show the harmonics which can be derived from this keynote.

Thus, the symbol carrier is printed with a table of symbols of the tones of the various scales which is arranged in parallel horizontal rows and parallel vertical columns, and the window carrier is provided with window apertures *f* which are arranged in groups of vertical columns parallel with respect to one another, and whose size is so dimensioned that they unmask only one symbol at a time of the symbol carrier situated below, their arrangement being effected with a spacing corresponding to the spacing of the horizontal rows of the symbol carrier. Identically in all the constructional forms the symbol carrier comprises 25 vertical columns with tone symbols, namely, starting from a central column with the symbols of the tones of the C major scale, 12 columns in each case to both sides — corresponding to the chromatic scale — with the symbols of the sharp keys formed by the conventional symbol # and the symbols of the flat keys formed by the conventional symbol ♭, double sharps and flats being shown as # # and ♭♭ respectively flattening, and within each horizontal row and each vertical column, taking the circle of fifths or the circle of fourths as the basis, the neighbouring tone symbols have the tonal interval of a fourth in one direction and a fifth in the opposite direction.

The symbol carrier 1A of the simpler constructional form, whilst maintaining these general principles, has five horizontal rows 1 with tone symbols which are characterised by various indices in accordance with their harmonic graduation. The central tonic row 1*t*, to the symbols of which the window carrier is to be adjusted in each case in order to determine a desired musical relationship, is followed in the upward direction by the dominant row 1*d* and the double-dominant row 1 *dd*, and in the downward direction by the sub-dominant row 1*s* and the double-sub-dominant row 1*sd*. Each row has 25 tone symbols which are arranged in vertical columns 3. Within each horizontal row 1 the neighbouring consecutive tone symbols have the following musical intervals: an augmented fifth in each case in the direction from the left towards the right, and an augmented fourth in each case in the direction from the right towards the left, and within each vertical column 3 corresponding to the interval of an augmented fourth (downwards from above) or an augmented fifth (upwards from below). The central column, that is to say the thirteenth, is column 3c and within this column the tone symbol C of the central row 1 forms as the keynote of the C major scale the starting and orientation point for the entire harmony system set forth in the table, starting from which in both directions the keynotes of all the flat major keys formed by flattening — in the direction towards the left — are arranged and the sharp keys formed by raising — in the direction towards the right, and from which in the upward direction there follow the dominant and double-dominant and below the sub-dominant and double-sub-dominant. Because of the particular arrangement, in all the rows the same symbol is represented on the diagonals extending from the upper left to the lower right.

The associated window carrier 1B comprises in an in-register arrangement with the thirteenth column 3*c* for the C major scale on the symbol carrier, windows f which are arranged in a vertical column 5*t* — and are indicated as black areas in the drawings — these windows being at the same spacing from one another as the rows 1 of the symbol carrier. When the window carrier lies on the symbol carrier in a fully coinciding condition, therefore, there appear in the windows *f* the symbols C, G, D, F and B which belong to the C-major harmony as tonic, dominant, double-dominant, subdominant and double-sub-dominant.

The window carrier 1B also comprises in an in-register arrangement with the first and last columns 3*b* and 3*k* respectively of the symbol carrier in each case a further row of windows *f* which are arranged in a vertical column 6*t*, 7*t* and which are intended to show the enharmonic change of the particular key which has been set. If for example the window carrier is made to coincide completely with the symbol carrier, there appear in the left-hand window column 6*t* the symbols of the D-double flat major as tonic and the associated simple and extended cadences, and in the right-hand window column the symbols of B-sharp are tonic and the associated harmony tones, both of which correspond to C-major. If the window carrier with the central window column 5*t* is set to another key than C-major, there only appears in one of the two outer window columns 6*t* or 7*t* a second symbol group as an enharmonic change of the key which has been set; thus for example if the window column 5*t* is set to B-major, C-flat major appears in the left-hand window column 6*t*, and in the case of setting to G-flat major, F-sharp major appears as the respective emharmonic change in the right-hand window column 7*t*.

Figure 1B:
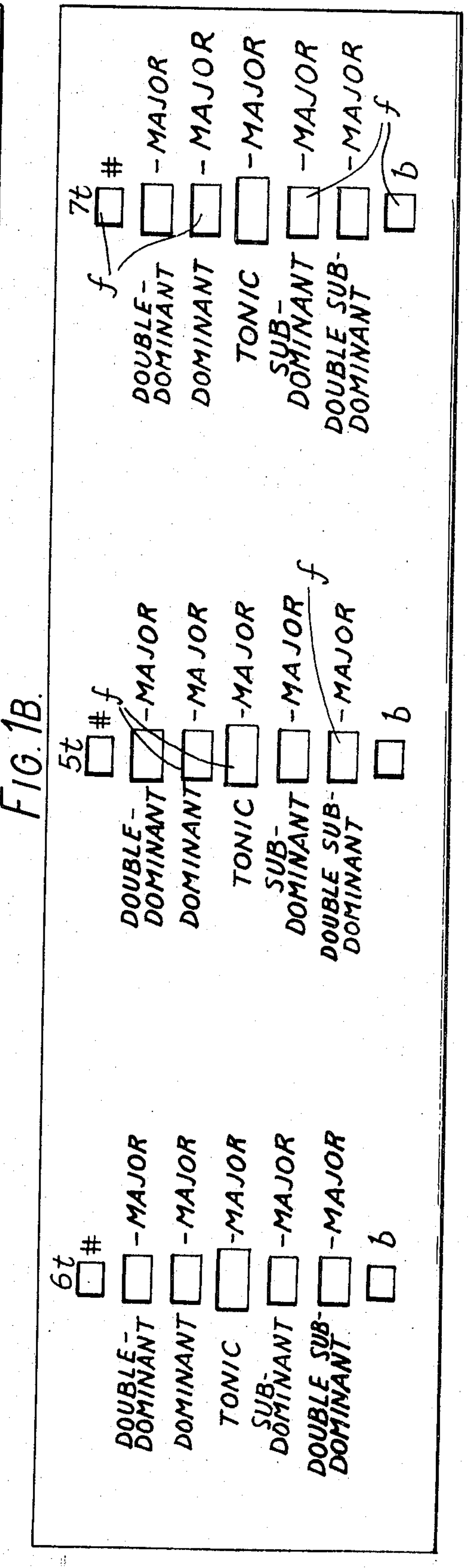
FIG. 1B shows the associated window carrier.

The constructional form shown in FIGS. 1A, 1B, also gives information regarding the number of sharps and flats contained in the key which has been set. For this purpose there is arranged on the symbol carrier 1A above and below the tone symbol rows (1*t*, 1*d*, 1*dd*, 1*s*, 1*sd*) at the same column division in each case a row of numbers in the upper row of which 1*k* there is shown the number of sharps including double sharps, and in the lower 1*b* the number of flats including double flats. In accordance with the arrangement of the entire system, in the upper number row 1*k*, beginning from its central column 3*c*, there are inscribed beginning towards the right the numbers 1 to 12 in ascending order, and to the left above all the remaining columns the number 0, and in the lower number row 1b in a corresponding arrangement, starting from the central column 3c (C-major key) the numbers 1 to 12 increasing towards the left, whereas towards the right the number 0 is inscribed below all the remaining columns. The window carrier 1b comprises correspondingly in every window column 5t, 6t, 7t above and below the windows for the tone symbols one further window in each case; of these, in the central window column 5t the upper window gives the number of sharps and the lower window the number of flats in the key set, whereas in the two outer window columns 6t and 7t respectively there appear the corresponding numbers for the associated enharmonic changes.

The constructional form described thus readily gives information, at each setting for a specific keynote as tonic, regarding the minor and major cadences, the associated enharmonic changes and the number of sharp and flat signs. Although this constructional form with the arrangement of musical symbols described and illustrated in the drawings is particularly suitable, nevertheless many other constructional forms with other symbol arrangements on the symbol carrier are conceivable and can be used with success. It would be readily possible, for example, to arrange the symbol rows in another sequence downwardly from above and to arrange the symbols in the rows in another sequence, possibly also departing from the circle of fifths, in which case the window carrier would also have to be adapted if necessary by another arrangement of windows; for example without prejudicing easy reading, the windows could be arranged in an inclined line instead of in a vertical line one below the other. However, it seems unlikely that another constructional form with another sequence of vertical columns is possible, wherein simultaneously with the tone symbols of one fundamental key in one first window group the tone symbols of the enharmonic changes thereof can be made visible in the second window group. For a prerequisite for this is that the symbols of the enharmonic changes of all the keys are at the same spacing from the symbols of these themselves, which appears to be possible only if the symbols are arranged with the use of the circle of fifths at the two sides of a central C-major scale.

Figure 2A:
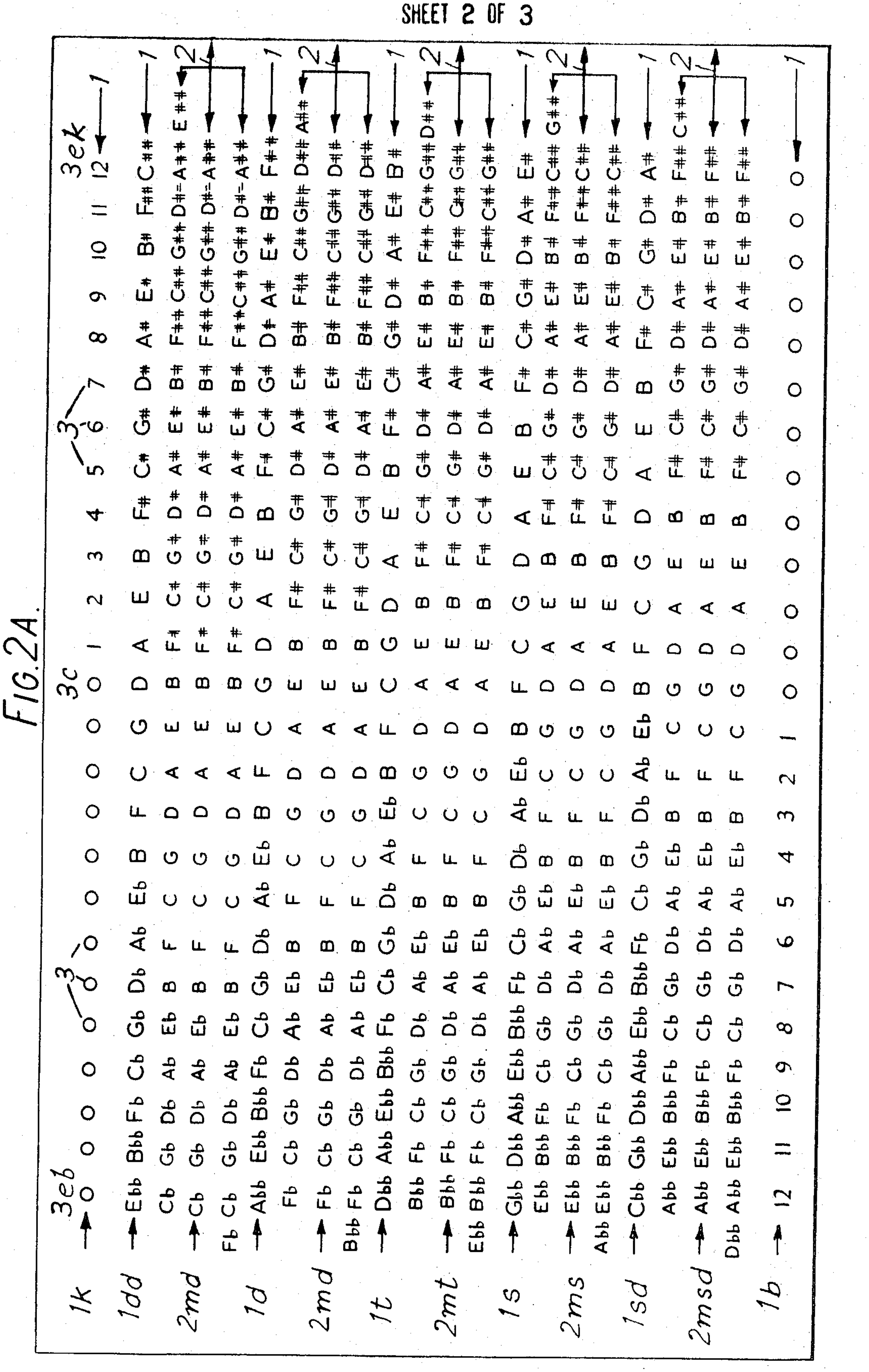
FIG. 2A shows the symbol carrier of improved constructional form for more detailed requirements.
Figure 2B:
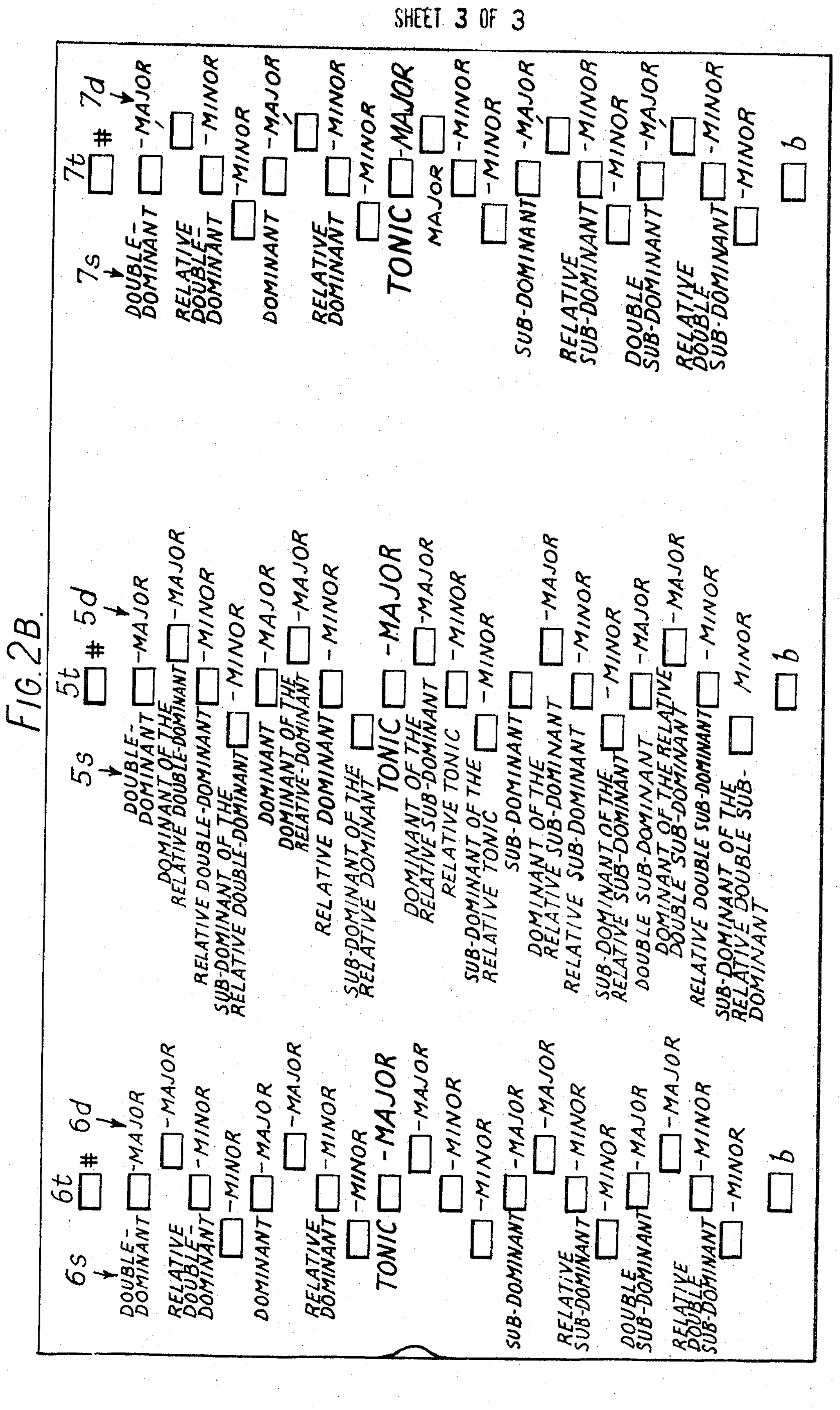
FIG. 2B shows the associated window carrier.

As compared with the constructional form described hereinbefore, the constructional form shown in FIGS. 2A, 2B is substantially improved with regard to the musical theory knowledge which can be imparted, and considerably enlarged as regards the number of items of information which the user can derive from it when he sets to a fundamental key. Whereas the constructional form described hereinbefore only gives information regarding the major keys, their main functions and their harmonic changes, and also the number of sharp or flat signs associated with each fundamental key, the constructional form shown in FIGS. 2A, 2B also gives the particular relative minors for the fundamental key and their main functions and also the cadences associated therewith.

For this purpose, the symbol carrier 2A comprises between the rows 1 of the symbols spaced from one another adequately, groups of in each case three intermediate rows 2 with symbols identical to one another, these rows being at equal intervals from one another and from the neighbouring rows, the individual symbols being arranged in the same vertical columns 3 as the symbols of the main functions, and in the following arrangement.

Within each vertical column there are arranged between the tonic and dominant and also between dominant and double-dominant in each case in three rows one below the other the major augmented third, between tonic and sub-dominant, and between sub-dominant and double-sub-dominant and also below the double-sub-dominant again in three rows one below the other the minor diminished third. These tones in each case represent the keynote of the relative minors of the main function situated thereabove, for which reason the groups of the horizontal intermediate rows 2 are also designated individually as:

*mt* = relative minor of the tonic,
*md* = relative minor of the dominant,
*mdd* = relative minor of the double-dominant,
*ms* = relative minor of the sub-dominant,
*msd* = relative minor of the double-sub-dominant.

The window carrier is provided for each group of the intermediate rows, in a corresponding location to the symbols of the respective central intermediate rows, with an additional window *t;* these windows thus give the relative minors of the main functions at each setting of the window carrier. But there are also provided on the window carrier at the two sides of the central window column 5t at the spacing of the vertical columns of the symbol carrier 2B, respective additional supplementary window columns 5d and 5s, whose windows *f* unmask only some of symbols given at the points of intersection of the intermediate rows 2 with the corresponding columns of the symbol carrier, the windows of the supplementary window columns 5d, 5s and the main window column 5t being arranged offset relatively to one another. Owing to the arrangement of the symbols in the intermediate rows 2 of the symbol carrier 2A and the windows in the supplementary window rows 5d, 5s of the window carrier 2B, there appear in the latter respectively the dominants (5d) and sub-dominants (5s) of the relative minors, relatively to the main functions, appearing in the main window row 5t. In the same arrangment there are also provided at the two sides of the two lateral window rows 6t and 7t supplementary window rows 6d, 6s, and 7d, 7s respectively, whose windows unmask in corresponding manner the symbols of the dominants and sub-dominants for the enharmonic changes of the relative minors.

The more complete constructional form shown in FIGS. 2A, 2B thus gives the following information, after the setting of the keynote of a specific major key as tonic, (by indicating the keynote in each case):

1. In the central main window row:
   - a. The main functions, namely tonic, dominant, double-dominant, sub-dominant, double-sub-dominant, (five major chords);
   - b. The relative minors for these, namely relative tonic (TP), relative dominant (DP), relative double-dominant (DDP), relative sub-dominant (SP), relative double-sub-dominant (SDP) (five minor chords).
   - c. The key signatures of the tonics set.
2. In the associated supplementary window rows:

The cadences of the relative minors, namely the dominants and sub-dominants of the TP, DP, DDP, SP and SDP (five major and five minor chords).

Since some of these 20 chords appear twice owing to the peculiarities of the harmonic system, the number of chords different from one another to be read off at one setting decreases to 15, namely nine major and six minor chords. Thus for example when the teaching aid is set to C-major, the symbol D appears as its double-dominant and as the dominant of its relative double-sub-dominants; furthermore with this setting the relative dominant (E-minor), the relative tonic (A-minor), the relative sub-dominant (D-minor) and the relative double-sub-dominant (G-minor) appear each a second time as the dominant of the respective relative minors which are higher by a fifth.

In the lateral window rows including the associated supplementary window rows at the same time the totality of the enharmonic changes of the chords given hereinbefore are visible, with the symbols of their respective keynotes and the number and type of their signatures, so that not only is the number of chords actually given increased, but the information given regarding the existing musical theory relationships can be augmented.

What I claim is:

1. An aid for representing the harmony system of tonal music and for illustrating diagrammatically the keys and harmony sequences which are related to one another under the laws of harmony, comprising two parts which are adapted to be displaced with a sliding action, relatively to one another, one of the two parts being constructed as a symbol carrier which carries note symbols on its upper side in rows with equal spacing therebetween and in columns generally transverse to said rows one below the other arranged with equal spacing, the symbols comprising the key notes and chord tones of the keys of the major and minor series in a specific arrangement based on the circle of fifths and circle of fourths, within each row and each column the neighboring tone symbols representing the key notes having the tonal interval of a fourth in one direction and a fifth in the opposite direction, and the other part, which is constructed as a window carrier and masks the symbol carrier, include at least one series of window apertures which are arranged one below the other in a column parallel to the column in the symbol carrier and whose number and arrangement coincides with those of the symbols within a column, so that after a suitable setting of the two parts only the symbols coincident with said window apertures are visible in the windows.

2. An aid according to claim 1, in which the symbol carrier includes twelve columns on each of the two sides of a central column with the symbols of the non-sharpened tones of the C major scale with the symbols of the sharp keys spaced to the right and the flat keys spaced to the left so that, whilst maintaining the tone intervals of a fourth and fifth respectively of neighbouring columns, the double-sharp and double-flat enharmonic change forms the end column in each case, and the window carrier includes at a spacing corresponding to the two end columns, when said window column is arranged over the symbol column of the C major scale on the symbol carrier, two further columns of windows in one or both of which columns the symbols of the enharmonic changes of the keys set are visible.

3. An aid according to claims 1, in which the tone symbols inscribed within a column are so arranged that the respective tonic indicated in a central row is followed in the upward direction of the dominant and double-dominant, and in the downward direction by the sub-dominant and double-sub-dominant, which, with appropriate setting of the two parts relatively to one another, are visible in a window column of the window carrier.

4. An aid according to claim 1, wherein at least one additional intermediate row of symbols is arranged on the symbol carrier between the rows representing the key notes in such a manner that the major augmented third appears in each case within a column between tonic and dominant and between dominant and double-dominant, and the minor diminished third is given in each case between tonic and sub-dominant, and sub-dominant and double-sub-dominant and below the double-sub-dominant, and that on the window carrier between the windows of the window column there are arranged additional windows in such a manner that they unmask those symbols of the intermediate row situated in the column which correspond to the key notes of the relative minors associated with a specific preset tonic, its dominant, double-dominant, sub-dominant and double-sub-dominant.

5. An aid according to claim 4, in which said relative minors comprise in each case three intermediate rows with the same symbols, at the same spacing from one another and from the neighboring rows, and the window carrier comprises at the two sides of the window column or columns at the spacing of the columns of the symbol carrier, respective supplementary window columns whose windows are arranged at a spacing to unmask some of the symbols given at the point of intersection of the intermediate rows with the neighboring columns, the arrangement of the symbols of the intermediate rows on the symbol carrier and of the supplementary window columns on the window carrier being such that in the windows thereof the symbols of the cadences associated with the relative minors appear.

6. An aid according to claim 1, in which on the symbol carrier there is inscribed above and below the rows of tone symbols in each case a row of numbers with the numbers 0 to 12, indicating the number of sharps and flats of the preset tonic, with which one window aperture is associated in each window column on the window carrier for the number rows.

7. An aid according to claim 1, in which its two parts are in the form of bars and are provided with corresponding means for guiding one another in sliding longitudinal displacement in the direction of their longitudinal axes.

8. An aid according to claim 7, in which one of the two parts, symbol carrier or window carrier, is constructed in the manner of the slide of a slide rule with grooves, in which the other part, window carrier or symbol carrier, is slidably guided by means of corresponding tongues.

* * * * *